UNITED STATES PATENT OFFICE.

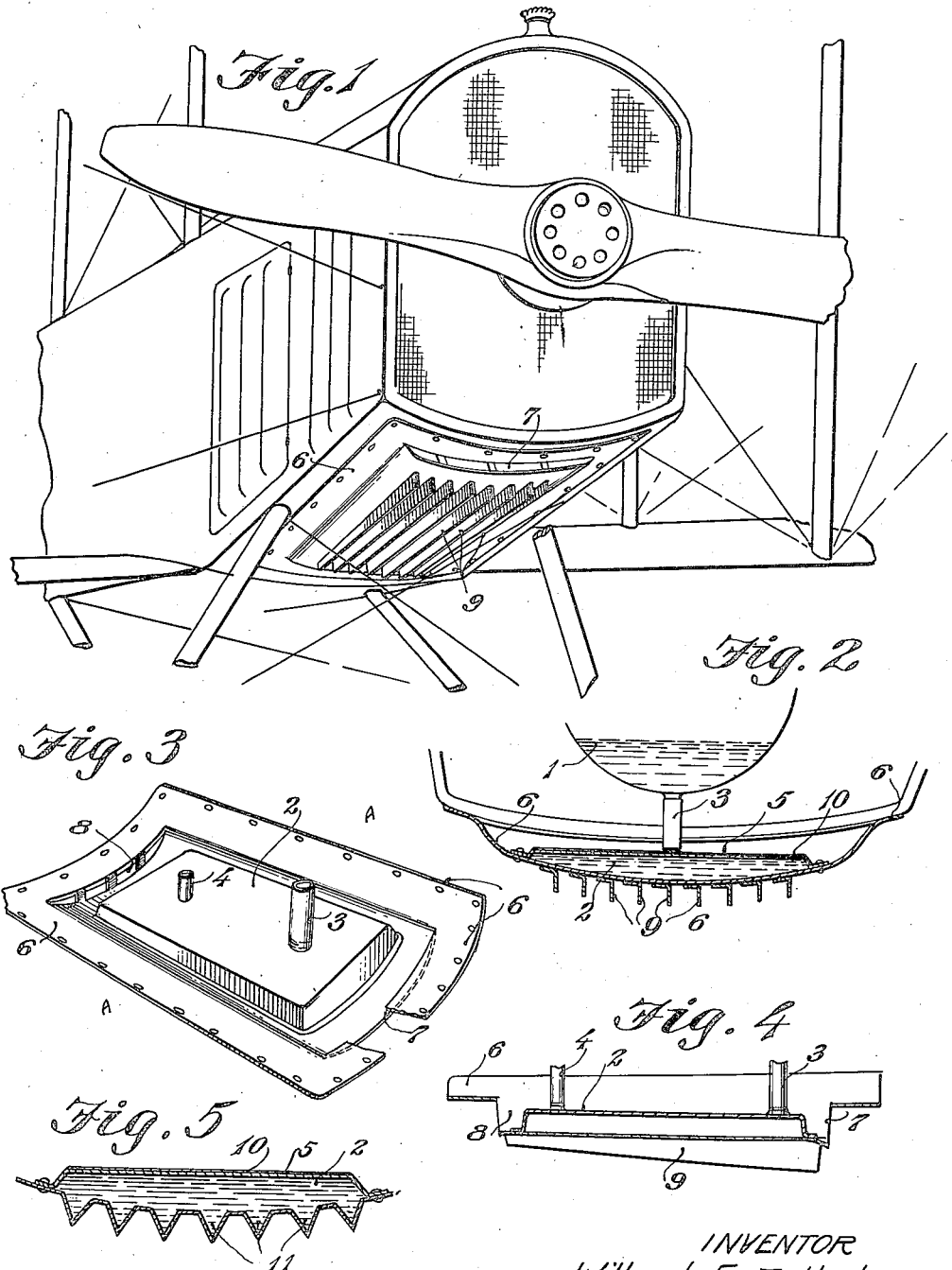

WILLARD E. TALBOT, OF DAYTON, OHIO.

OIL-COOLING DEVICE.

1,318,706.   Specification of Letters Patent.   Patented Oct. 14, 1919.

Application filed February 6, 1919. Serial No. 275,469.

*To all whom it may concern:*

Be it known that I, WILLARD E. TALBOT, a citizen of the United States, residing at Dayton, in the county of Montgomery and State of Ohio, have invented certain new and useful Improvements in Oil-Cooling Devices, of which the following is a specification, reference being had therein to the accompanying drawing.

This invention relates to an oil cooling device and is designed more particularly for use in connection with airplane engines.

Much difficulty is experienced in the operation of airplanes from the heating of the oil in the lubricating system, this being particularly true with certain types of engines. Various efforts have been made to provide means for cooling this oil, but these efforts have not been wholly successful.

The object of this invention is to provide a device which will effectively cool the engine lubricant; and which can be either built into the airplane when the latter is constructed or applied thereto after the airplane has been completed.

It is also an object of the invention to provide a device of this kind which will produce a cooling effect not only upon the oil in the cooling device itself, but upon the oil in the crank case or sump which constitutes a part of the lubricant circulating system of the engine.

It is also an object of the invention to provide a device of this kind which will be very simple both in its construction and in its operation and which can be manufactured and applied to an airplane at a relatively low cost.

Other objects of the invention will appear as the device is described in detail.

In the accompanying drawings Figure 1 is a perspective view of a portion of an airplane showing my invention applied thereto; Fig. 2 is a transverse sectional view taken through the sump and the cooling device; Fig. 3 is a perspective view of the cooling device, partly broken away; Fig. 4 is a longitudinal sectional view of the cooling device; and Fig. 5 is a transverse sectional view of a slightly modified form of the cooling device.

In these drawings I have illustrated one embodiment of my invention and have shown the same as applied on an airplane of standard construction, but it will be understood that the device may be applied to airplanes of various kinds, and further, that its use is not necessarily limited to airplane engines. This particular device has been designed for use in connection with a Hispano-Suiza engine, but, obviously, the device can, with little or no modification, be utilized in connection with engines of various kinds.

In the present illustration of the invention I have shown the cooling device as applied to the forward portion of the fuselage of an airplane, the lower portion of which constitutes the bottom of the crank case or sump 1 in which the oil of the lubricating system accumulates, and from which it is taken by means of a pump and delivered to the various parts of the engine which are to be lubricated. This lubricating system is of ordinary construction and need not be here shown or described in detail.

The cooling device is shown in the form of a receptacle 2 which communicates with the sump so that the oil will circulate therethrough and thus, in effect, forms part of a conduit through which the lubricant circulates. The receptacle may communicate with the sump in any suitable manner but, in the present instance, the receptacle is somewhat elongated in shape and is provided at its forward end with an intake pipe 3 which is connected with the sump and through which the lubricant passes by gravity. At the opposite end the receptacle is provided with an outlet pipe 4, by means of which it may be connected with the pump. The receptacle may be connected with the lower surface of the air plane structure, or sump, in any suitable manner, but it is preferably so arranged that its upper wall will be spaced away from the lower wall of the sump so as to form an air passage 5 through which the air will circulate with considerable velocity when the airplane is in motion. As here shown, the receptacle is provided at its several edges with flanges 6 preferably forming extensions of the lower wall of the receptacle and extending upwardly to form attaching means for the receptacle, the flanges being of such width and shape that the upper wall of the receptacle will be spaced from the bottom wall of the sump, as shown more clearly in Fig. 2 The space 5 between the receptacle and the sump is in open communication with the atmosphere and where the receptacle is connected with the airplane by flanges, as above described, the front and rear flanges are provided with transverse openings or louvers 7 and 8, through which the air may circulate freely. The lower surface of the cooling receptacle is provided with suitable heat radiating means, such as fins 9, which cause the heat to be rapidly dissipated. The fins may be of any suitable character and arrangement but, preferably, they are arranged lengthwise of the receptacle, and of the airplane, so that the air will circulate freely between them and, as here shown, they are of less width at their rear ends than at their forward ends. This tapered construction permits the heat which is radiated from the forward portions of the fins to escape without coming in contact with the rear portions of the fins to the same extent that it would come in contact with these rear portions if the fins were of the same width throughout their length. It will be noted that the receptacle is so mounted on the airplane that it is at an inclination to the horizontal and, consequently, is arranged obliquely to the line of travel of the airplane so that the air will strike against the lower surface of the receptacle and will have a maximum of cooling effect thereon. It is preferable that as little heat as possible should be radiated from the upper surface of the cooling receptacle, as the heat radiated from this surface will come in contact with the bottom wall of the sump and tend to heat the same, or at least to prevent the cooling of the sump. I have, therefore, covered the upper surface of the receptacle with insulating material, such as a suitable insulating paint, as shown at 10. As a result, little or no heat is radiated from the upper surface of the cooling receptacle and the air which circulates through the passageway 5 not only tends to carry away what little heat may escape from the upper surface of the cooling receptacle, but it has a very effective cooling action upon the sump itself, so that the oil in the sump is partially cooled before it is delivered to the receptacle 2. Consequently, the cooling action as a whole is highly efficient and it has been demonstrated in actual service that a cooling device constructed and applied as herein shown will maintain the oil in the lubricating system at a temperature approximately 40° lower on the average than it can be maintained by any other cooling system of which I have knowledge. In official tests made with an Hispano-Suiza engine an average temperature of 118° F. has been maintained throughout the flight, with a maximum temperature of 135° F., and in some flights an even lower average temperature has been maintained.

The heat radiating means with which the lower surface of the receptacle is provided may, as stated, take various forms, and in Fig. 5 I have shown a slight modification, in which the lower surface of the receptacle is provided with hollow fins communicating with the interior of the receptacle, these fins being here shown as V-shaped ribs 11 communicating at their upper edges throughout their length with the body of the receptacle.

The operation of the cooling device will be readily understood from the foregoing description thereof, and it will be apparent that I have provided a cooling device which is very simple in its construction and operation, which adds but little to the weight of the airplane, and which will have a very effective cooling action upon the lubricant. Further, because of its simplicity in construction and the ease with which it can be applied to an airplane, the device can be manufactured and installed at a relatively low cost and, further, will have no parts liable to become disarranged or be rendered inoperative in service and, consequently, there will be little or no upkeep cost.

While I have shown and described one embodiment of the invention I wish it to be understood that I do not desire to be limited to details thereof, as various modifications will occur to a person skilled in the art.

Having thus fully described my invention, what I claim as new and desire to secure by Letters Patent, is:

1. The combination with an engine having a part forming a sump for the engine lubricant, of a substantially flat lubricant receptacle supported beneath and adjacent to, but out of contact with, said sump, extending lengthwise thereof and communicating therewith.

2. The combination with an engine having a part forming a sump for the engine lubricant, of a substantially flat lubricant receptacle supported beneath and adjacent to said sump, extending lengthwise thereof and communicating therewith, said receptacle having its upper surface spaced from said sump and having its lower surface provided with heat radiating means.

3. The combination with an engine having a part forming a sump for the engine lubricant, of a cooling device comprising a substantially flat receptacle supported adjacent to, but out of contact with, said sump, communicating therewith and having its lower surface provided with heat radiating fins.

4. The combination with an engine having a part forming a sump for the engine lubricant, of a lubricant receptacle supported beneath said sump and communicating therewith, said receptacle having its upper surface spaced from said sump, and having said space closed along its lateral edges to form an air passage, and having its lower surface provided with heat radiating means.

5. The combination with an airplane comprising an engine and having a part forming a sump for the engine lubricant, of a substantially flat lubricant receptacle supported beneath and adjacent to, but out of contact with, said sump, extending lengthwise thereof and communicating therewith, said receptacle having its lower surface extending obliquely to the line of travel of said airplane for contact with the air, and provided with heat radiating means.

6. The combination with an airplane comprising an engine and having a part forming a sump for the engine lubricant, of a substantially flat lubricant receptacle supported beneath and adjacent to, but out of contact with, said sump, extending lengthwise thereof and communicating therewith, said receptacle having its lower surface extending obliquely to the line of travel of said airplane for contact with the air, and provided with heat radiating fins extending lengthwise thereof.

7. The combination with an airplane comprising an engine and having a part forming a sump for the engine lubricant, of a substantially flat lubricant receptacle supported beneath and adjacent to, but out of contact with, said sump, extending lengthwise thereof and communicating therewith, said receptacle having its lower surface extending obliquely to the line of travel of said airplane for contact with the air, and provided with heat radiating fins extending lengthwise thereof, and said fins having their rear portions of less width than their forward portions.

8. The combination with an airplane comprising an engine and a lubricating system therefor, of a cooling device for the lubricant comprising a receptacle connected with said lubricating system and having its lower surface extending obliquely to the line of travel of said airplane and provided with heat radiating means, and having its upper surface covered with heat insulating material.

9. The combination with an airplane comprising an engine and having a part forming a sump for the engine lubricant, of a receptacle supported beneath and communicating with said sump, said receptacle being spaced from said sump to form an air passage between the receptacle and the sump.

10. The combination with an airplane comprising an engine and having a part forming a sump for the engine lubricant, of a receptacle supported beneath and communicating with said sump, said receptacle being spaced from said sump to form an air passage between the receptacle and the sump, and having its lower surface provided with heat radiating means.

11. The combination with an airplane comprising an engine and having a part forming a sump for the engine lubricant, of a receptacle supported beneath and communicating with said sump, said receptacle being spaced from said sump to form an air passage between the receptacle and the sump, and having its upper surface covered with heat insulating material.

12. The combination with an airplane comprising an engine and having a part forming a sump for the engine lubricant, of a receptacle supported beneath and communicating with said sump, said receptacle being spaced from said sump to form an air passage between the receptacle and the sump, having its lower surface provided with heat radiating means, and having its upper surface covered with heat insulating material.

13. The combination with an airplane comprising an engine and having a part forming a sump for the engine lubricant, of a receptacle supported beneath and communicating with said sump, said receptacle being spaced from said sump and having the space between its lateral edges and said sump closed to form a longitudinal air passage.

14. The combination with an airplane comprising an engine and having a part forming a sump for the engine lubricant, of a receptacle arranged beneath and communicating with said sump, said receptacle being spaced from said sump and having flanges extending from the several edges thereof to connect the same with said airplane, the front and rear flanges having openings therein to permit the circulation of air between said receptacle and said sump.

15. A cooling device of the character described comprising a receptacle having means for connecting the same with a circulation system, and having one surface covered with heat insulating material and having another surface provided with heat radiating means.

16. A cooling device of the character described comprising a receptacle having means for connecting the same with a circulation system and having its lower surface provided with fins which increase gradually in width from their front ends to their rear ends.

17. A cooling device of the character described comprising a receptacle having means for connecting the same with a circulation system and having its lower surface provided with hollow fins communicating with the interior of said receptacle.

In testimony whereof, I affix my signature hereto.

WILLARD E. TALBOT.